(12) United States Patent
Bovio et al.

(10) Patent No.: US 6,618,256 B1
(45) Date of Patent: Sep. 9, 2003

(54) GUIDE SYSTEM FOR A REMOVABLE ELECTRONIC DEVICE IN A COMPUTER BAY

(75) Inventors: Michele Bovio, Boston, MA (US); Allan S. Baucom, Townsend, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/095,442

(22) Filed: Jun. 10, 1998

(51) Int. Cl.[7] .................................................. G06F 1/16
(52) U.S. Cl. ........................ 361/727; 361/724; 439/377
(58) Field of Search .................................. 361/685, 724, 361/725, 727; 439/374, 377, 64

(56) References Cited

U.S. PATENT DOCUMENTS

| | | | |
|---|---|---|---|
| 4,977,532 A | | 12/1990 | Borkowicz et al. ......... 364/708 |
| 5,045,960 A | * | 9/1991 | Eding .......................... 361/685 |
| 5,155,662 A | | 10/1992 | I-Shou ......................... 361/392 |
| 5,233,594 A | | 8/1993 | Wilhelm ..................... 369/75.1 |
| 5,269,698 A | * | 12/1993 | Singer ......................... 361/685 |
| 5,327,323 A | | 7/1994 | Yeom et al. ................. 361/685 |
| 5,721,669 A | * | 2/1998 | Becker et al. .............. 361/385 |
| 5,899,768 A | * | 5/1999 | Kameyama .................. 439/374 |

* cited by examiner

*Primary Examiner*—Darren Schuberg
*Assistant Examiner*—Hung Van Duong

(57) ABSTRACT

A removable electronic module of this invention includes an electronic device, such as a memory storage drive, having an electrical device connector for mating with an electrical bay connector in a computer. The module also includes a connector guide mounted about the electrical device connector. The connector guide is adapted to engage the electrical bay connector to align the electrical device connector with the electrical bay connector. The module further includes an auxiliary device guide positioned apart from the connector guide. The auxiliary device guide is adapted to engage an auxiliary bay guide to align the connector guide with the electrical bay connector.

17 Claims, 5 Drawing Sheets

GUIDE SYSTEM FOR A REMOVABLE ELECTRONIC DEVICE IN A COMPUTER BAY

BACKGROUND

Computers generally include a central processing unit which is physically and electronically connected to a variety of electronic devices, including various kinds of memory storage drives, battery packs and various input or output devices. In some computers, particularly portable notebook computers, a bay is provided in the computer for the removable mounting of an electronic module including an electronic device, such as a memory storage drive (e.g., a hard drive, a 5¼-inch floppy disk drive, a 3½-inch disk drive or a CD-ROM drive). Within the bay of the computer, an electrical connector coupled with the processor is mated with a reciprocal electrical connector on the removable module to allow electronic communication between the processor and the removable module. The removable module includes, for example, a memory storage drive or a battery pack, and can be sequentially inserted into and removed from the bay of the computer. Either the same module or a different module can then be reinstalled in the bay. In such an arrangement, the user can install and substitute particular modules depending upon the user's needs.

A memory-storage-drive module, for example, is typically changed by pulling one drive from the bay by hand and pushing another drive into place. Each drive includes an electrical connector extending from the rear of the drive which engages a mating electrical connector located at the rear of the bay. The mated electrical connectors provide electrical as well as mechanical engagement.

SUMMARY OF THE INVENTION

A problem with existing computers is that alignment of the electrical connectors during installation of a drive is somewhat tricky because visual alignment of the electrical connectors is not possible.

The present invention provides a solution to the foregoing problem. A removable electronic module of this invention includes an electronic device with an electrical device connector for mating with an electrical bay connector. The module further includes an auxiliary device guide and a connector guide. The guides are provided to facilitate mating of the electrical connectors. First, an auxiliary device guide is provided for engaging an auxiliary bay guide to align a connector guide with an electrical bay connector. Second, a connector guide is provided to align the electrical device connector with the electrical bay connector to facilitate mating between the electrical connectors. The connector guide is mounted about the electrical device connector.

In preferred embodiments, the electrical device connector includes beveled edges to gradually engage the electrical bay connector. The connector guide includes two opposed flanges having guide surfaces angled to allow the connector guide to gradually engage the electrical bay connector. The auxiliary device guide likewise includes a pair of angled surfaces designed to gradually engage the auxiliary bay guide.

The electronic device is preferably mounted in a tray. The connector guide and the auxiliary device guide are mounted on a back side of the tray, from which the electrical device connector extends. A preliminary device guide, preferably including elongate rails positioned on opposite sides of the subject electronic module, is provided to engage a preliminary bay guide and to align the auxiliary device guide with the auxiliary bay guide. The electronic module is preferably a memory storage drive.

A guide system of this invention is designed to guide an electronic device into a bay. The guide system includes a cabinet which defines a port opening into a bay in which electronic modules can be inserted. An electrical bay connector is mounted within the bay. An auxiliary bay guide is also mounted within the bay, apart from the electrical bay connector. The guide system further includes a removable electronic module sized and shaped to be inserted through the port and mounted within the cabinet. The module includes an electrical device connector and auxiliary device guide positioned and adapted to mate with respective bay elements (also described above), within the bay. A connector guide is mounted either about the electrical bay connector or about the electrical device connector for engaging and aligning with the other electrical connector.

The guide system is typically a component of a computer. The computer further includes a processor mounted within the cabinet which is coupled to the electrical bay connector.

With the present invention, the electrical connector of a removable electronic storage device can be more easily and accurately mated with a reciprocal electrical connector in a bay of a computer. Consequently, the multi-stage alignment system of this invention enables the use of very small, highly reliable off-the-shelf electrical connectors that are not specifically designed for blind mating in a bay of a computer. Improved accuracy in the alignment of electrical connectors further serves to reduce wear and damage to the electrical connectors that can otherwise result from attempts to mate misaligned electrical connectors.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The features and other details of the method of the invention will now be more particularly described with reference to the accompanying drawings and pointed out in the claims. Numbers that appear in more than one figure represent the same item. It will be understood that the particular embodiments of the invention are shown by way of illustration and not as limitations of the invention. The principal features of this invention can be employed in various embodiments without departing from the scope of the invention.

Figure 1:
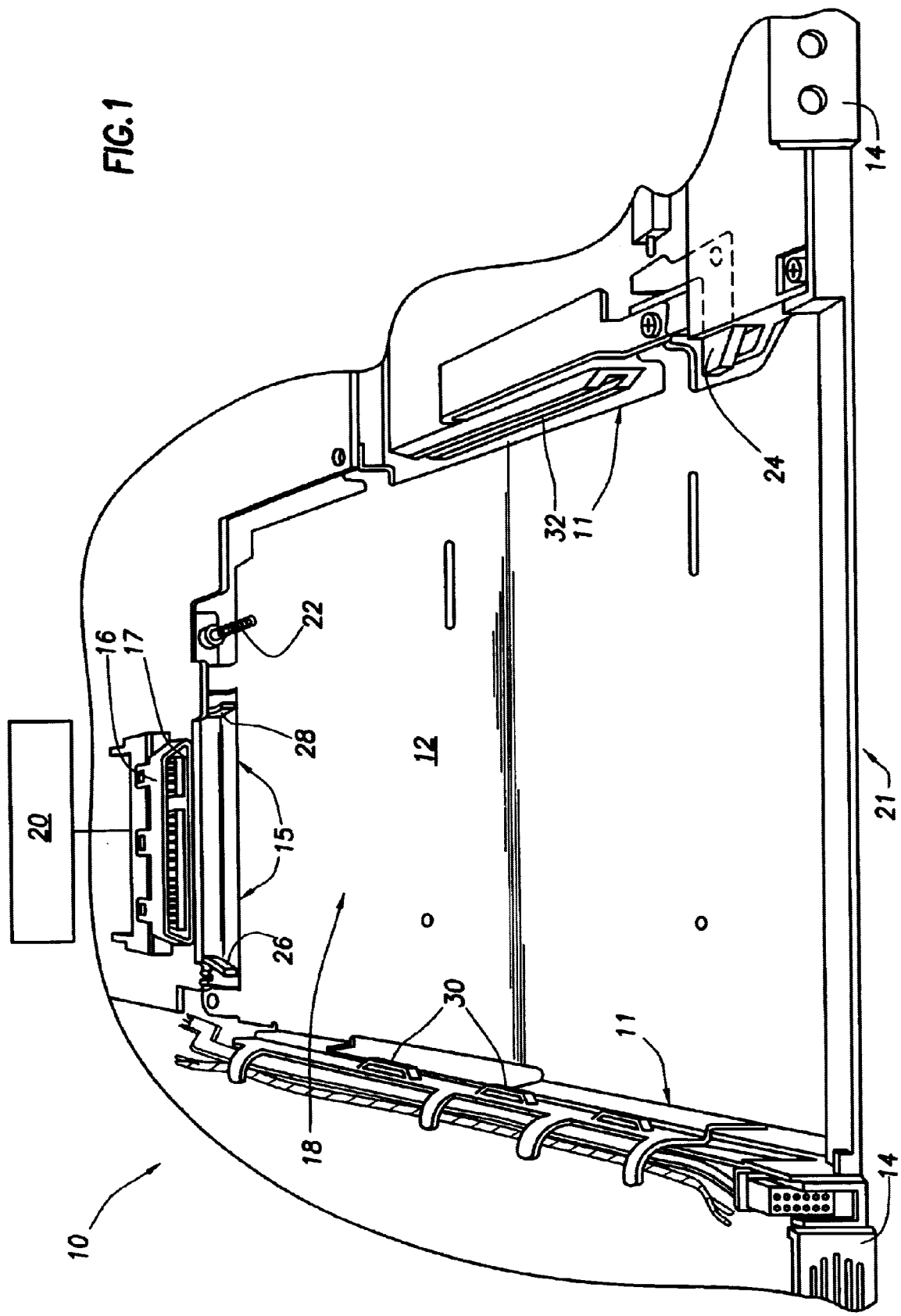
FIG. 1 is a perspective view looking into a bay of a modular computer of the present invention.
Figure 2:
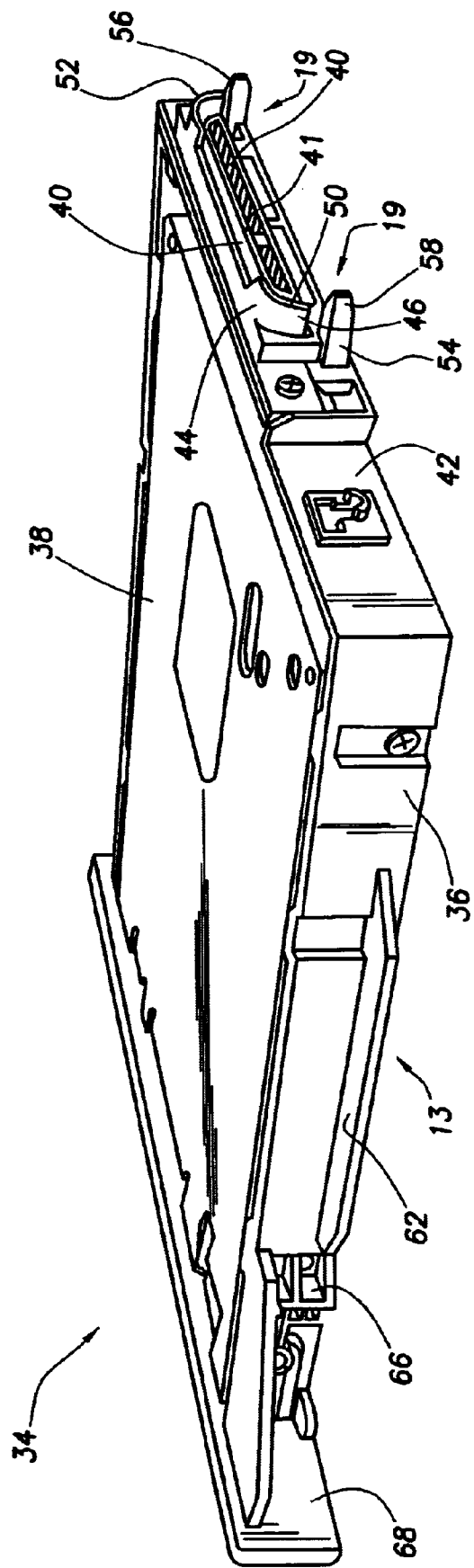
FIG. 2 is a perspective view of a removable electronic module of this invention.
Figure 3:
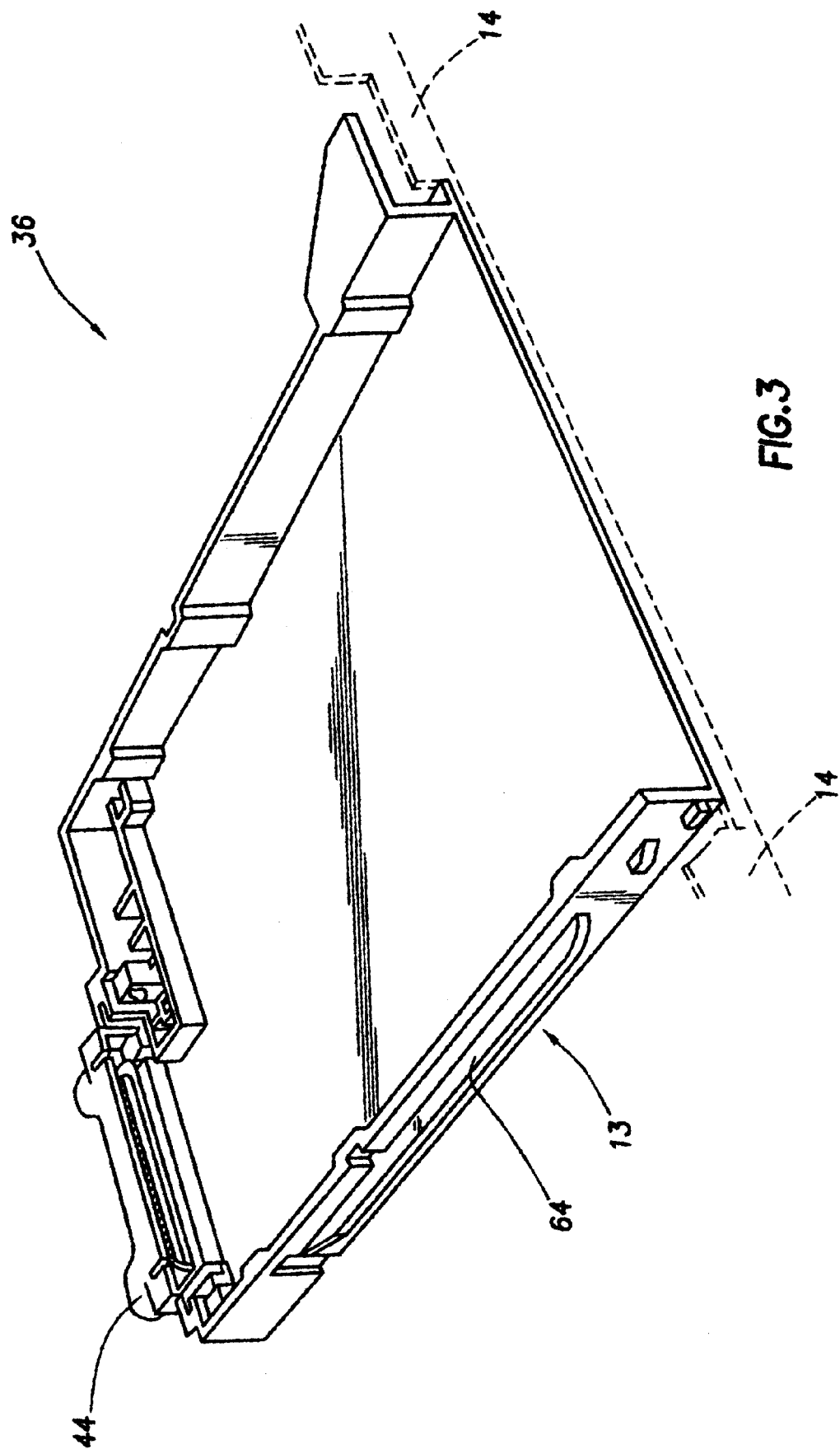
FIG. 3 is a perspective view of a tray of the removable electronic module of FIG. 2.

One embodiment of this invention includes a multi-stage alignment system including reciprocal alignment elements on a removable electronic module and in the bay of a computer. As shown in FIGS. 1–3, the alignment system includes preliminary guides 11, 13 on the sides of the bay 12 and module 34 providing an initial, coarse level of alignment. The preliminary guides 11, 13 align a pair of auxiliary guides 15, 19 mounted on the back of the module and in the back of the bay, providing more precise alignment for a connector guide 44 to engage an electrical bay connector 16. When the connector guide 44 engages the electrical bay connector 16, it even more finely aligns an electrical device connector 40 to mate with the electrical bay connector 16 to provide electronic communication between the electronic module 34 and a processor 20 in the computer. In a preferred embodiment, the mating surfaces of the electrical connectors 16, 40 are metallic, and each of the guides, 11, 13, 15 and 19 are made of plastic or a combination of metal and plastic.

A bay 12 of a portable notebook computer 10 of this invention is illustrated in FIG. 1. The bay 12 is set within a cabinet 14, the interrupted edges of which define a port 21 opening into the bay 12. The bay 12 includes an electrical bay connector 16, which is designed to provide an electrical interface with a reciprocal electrical device connector 40 (FIG. 2) on a removable electronic module 34.

The electrical connector 16 is mounted at an end 18 of the bay 12 remote from the port 21 and is electronically coupled with the computer's processor 20. The interior edges of the electrical bay connector 16 are openly angled to gradually engage an electrical device connector 40 (FIG. 2). A spring 22 is adjacent to the electrical bay connector 16, wherein the spring 22 is compressed when a removable electronic module 34 (FIG. 2) is mounted within the bay 12. When a latch 24 is released, the compressed spring 22 releases, ejecting the removable electronic module 34 (FIG. 2) through port 21.

In accordance with this invention, at least one bay guide, e.g., 11 or 15, is mounted within the bay 12. First, an auxiliary bay guide 15 is provided at the remote end 18 of the bay 12, below the electrical bay connector 16. In this embodiment, the auxiliary bay guide 15 is a pair of rails 26, 28 for engaging complementary prongs 56, 54 (FIG. 2) on a removable electronic module. The rails 26, 28 of the auxiliary bay guide 15 curve outwardly toward the port 21. This embodiment also includes another guide, a preliminary bay guide 11. In this embodiment, the preliminary bay guide 11 takes the form of a pair of tracks 30, 32 for engaging and aligning the side rails 64, 62 (FIGS. 3, 2) of a removable electronic module 34 as the module 34 is loaded into the bay 12.

The bay 12 is dimensioned to accommodate removable electronic modules of standardized dimensions. Since various devices have different manufacturing tolerances, the clearance required in the bay area for the various devices typically needs to be fairly large. In the embodiment illustrated in FIG. 1, the bay 12 has a depth, from the port 21 to the electrical bay connector 16, of about 13 cm, a width of about 11 cm, and a height of about 1.5 cm.

A removable electronic module 34 for insertion into the bay of FIG. 1 is illustrated in FIG. 2. In this embodiment, the module 34 includes an electronic device 38 in the form of a 3.5-inch disc drive. Other electronic devices that can be included in modules of this invention include CD-ROM drives, 5.25-inch disc drives, hard drives and battery packs. The drive 38 is mounted in a tray 36, which forms a shell around the drive 38. In FIG. 3, the tray 36 is illustrated independently of the electronic device. In other embodiments, the tray 36 can be omitted or combined with the drive 38 to form a single, seamless shell.

As shown in FIG. 2, an electrical device connector 40 projects from the back 42 of the module 34. The electrical device connector 40 is sized and shaped to fit within an electrical bay connector 16, shown in FIG. 1, to provide a mechanical and electronic link there between. In the embodiment illustrated in FIG. 2, the electrical device connector 40 has an exterior width of about 40 mm and a height of about 3 mm. The exterior edges 41 of the electrical device connector 40 are inwardly beveled to gradually engage an electrical bay connector 16 (FIG. 1). A connector guide 44 is positioned about the electrical device connector 40 to guide the electrical device connector 40 into an electrical bay connector 16 (FIG. 1). Preferably, the connector guide 44 is designed to enclose an electrical bay connector 16 (FIG. 1) on at least two sides. In the illustrated embodiment, the connector guide 44 includes a pair of flanges 46, 48 mounted on opposite sides of the connector guide 44. Each of the flanges 46, 48 includes a respective angled inner surface 50, 52, wherein the gap between the inner surfaces 50, 52 of the flanges 46, 48 expands slightly toward the remote ends of the flanges. Consequently, the flanges 46, 48 gradually engage and align with an electrical bay connector 16, shown in FIG. 1, just before the electrical device connector 40 and electrical bay connector 16 engage each other. Accordingly, the connector guide 44 provides advanced-stage alignment with a high level of precision.

In an alternative embodiment, the forms of the electrical connectors 40, 16 on the removable module 34 and the bay 12 are reversed, such that the electrical device connector 40 fits around the electrical bay connector 16. In this embodiment, the connector guide 44 is mounted about the electrical bay connector 16 to guide the electrical device connector 40 onto the electrical bay connector 16, rather than vice-versa.

The removable module 34 also includes an auxiliary device guide 19 for aligning the connector guide 44 onto an electrical connector 16 (FIG. 1). The auxiliary device guide 19 is preferably designed to engage an auxiliary bay guide 15 when the electrical connectors 16, 40 (see FIG. 4) have approached to within about 10 mm of each other. In this embodiment, the auxiliary device guide 19 (FIG. 2) is a pair of prongs 54, 56 with respective outer surfaces 58, 60 angled inwardly toward the remote end of each prong 54/56. The dimension between the outer surfaces 58, 60 (FIG. 4) of the prongs 54, 56 approximately matches the dimension between the inner surfaces of the rails 28, 26 at the narrowest portion of the auxiliary bay guide 15 (FIG. 1) into which the auxiliary device guide 19 is inserted. In a preferred embodiment, the remote tips of the prongs 54, 56 are 52 mm apart. In another preferred embodiment, prongs 54, 56 can engage the outer surfaces of rails 28, 26 if appropriately shaped.

In the embodiment of FIG. 2, yet another guide, a preliminary device guide 13, is also provided. The preliminary device guide 13 is positioned on opposite sides of the tray 36. In this embodiment, the preliminary device guide 13 comprises a pair of elongate rails 62, 64 (FIG. 3) shaped and positioned to slidably engage respective tracks 32, 30 of the preliminary bay guide 11 when the module 34 is inserted into the bay 12 of FIG. 1. One of the rails 62 of the preliminary device guide 13 is visible in FIG. 2. The other rail 64 is visible in FIG. 3. The preliminary device guide 13 engages its reciprocal bay guide 11 (FIG. 1) to provide a preliminary alignment before the auxiliary device guide 19 engages its counterpart guide 15 (FIG. 1) in the bay 12. The preliminary device guide 13 thereby serves to align the auxiliary device guide 19 with the auxiliary bay guide 15 before the auxiliary guides 15, 19 engage one another for more precise alignment as the module 34 is inserted into the bay 12 (FIG. 1).

As shown in FIG. 2, the tray 36 also includes a notch 66 for receiving the latch 24 (FIG. 1) to lock the module 34 into place when fully inserted into the bay 12 (FIG. 1). A face plate 68 including a door for inserting diskettes is mounted on the face of the module 34 opposite the electrical device connector 40. When the module 34 is locked in its latched position within the bay 12 (FIG. 1), the outer surface of the face plate 68 is flush with the cabinet 14 (FIG. 1) of the computer 10.

Figure 4:
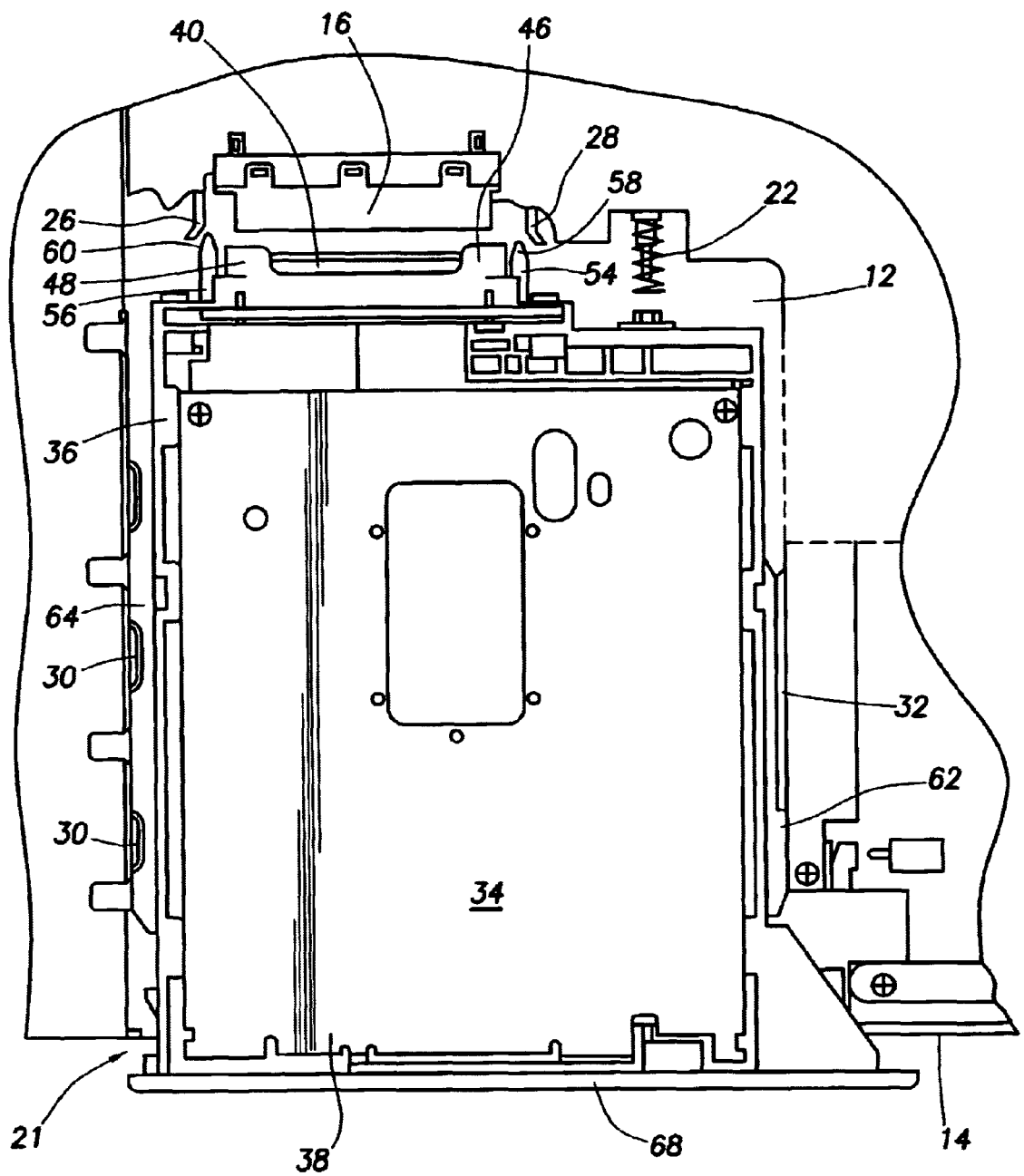
FIG. 4 is a planar view of the removable electronic module of FIG. 2 partially inserted into the bay of a modular computer of this invention.
Figure 5:
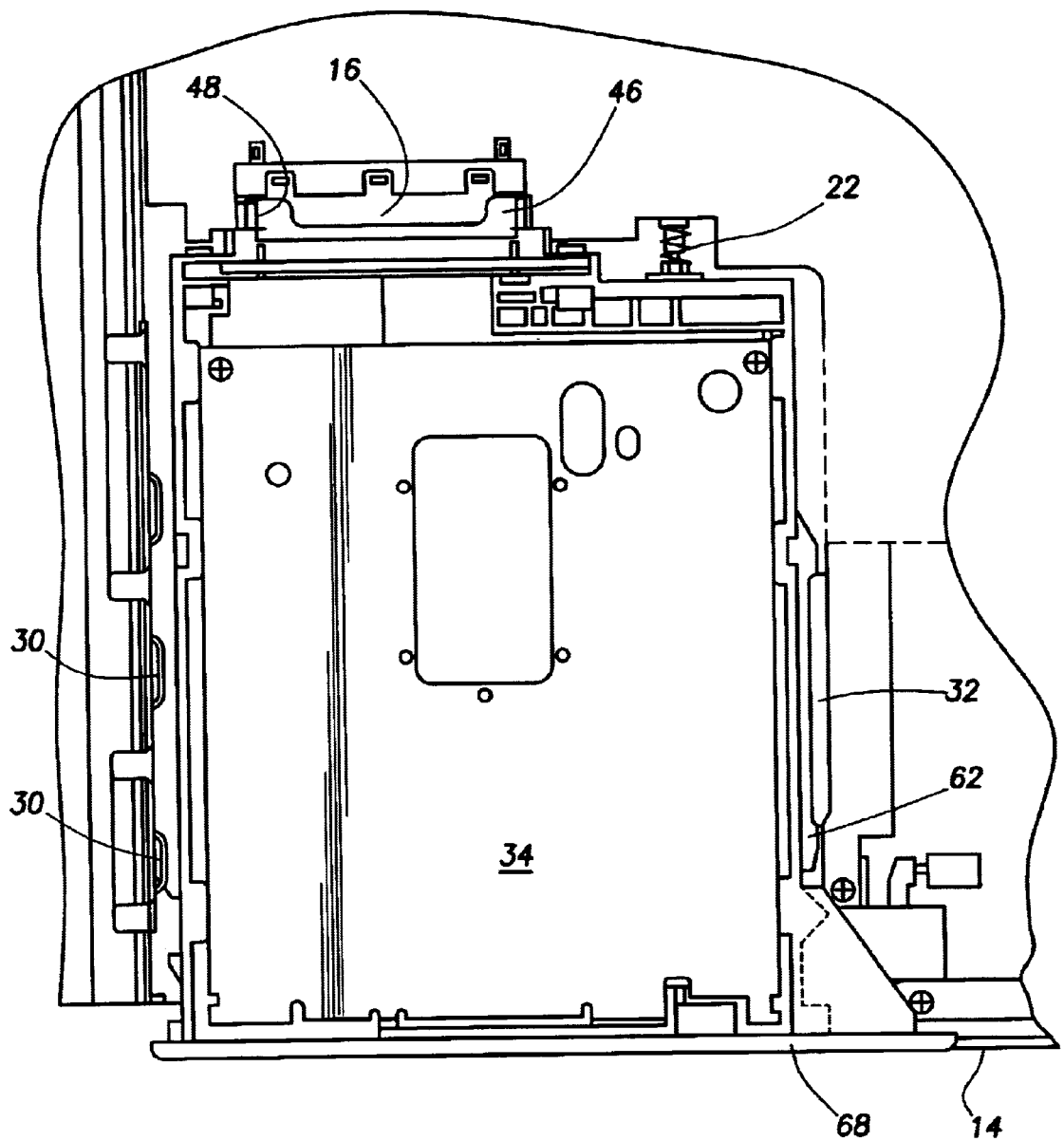
FIG. 5 is a planar view of a removable electronic module of FIG. 2 fully inserted in the bay of a modular computer of this invention.

The loading, or insertion, of a removable electronic module 34 into a bay 12 of a computer is illustrated in FIGS. 4 and 5. The module 34 is loaded through the port 21 and into the bay 12 with the electrical device connector 40 entering first. The rails 62, 64 of the preliminary device guide engage reciprocal tracks 32, 30 of the preliminary bay guide 11 (FIG. 1) as the module 34 is slid into the bay 12. In the illustration of FIG. 4, the auxiliary guides 15, 19 of the bay 12 and the module 34 have not yet engaged, though they have been roughly aligned by the preliminary guides 11, 13 (FIGS. 1–3). The rails 26, 28 of the auxiliary bay guide 15 (FIG. 1) have been made visible, in FIG. 4, by illustrating cutaways of the overlying circuit board. Further, the spring 22 has yet to engage the module 34.

In FIG. 5, the module 34 is fully inserted into the bay 12. The face plate 68 of the module 34 is flush with the cabinet 14. Each of the device guides 13, 19, 44 (FIGS. 2, 3) are fully engaged with reciprocal structures in the bay 12 and the electrical device connector 40 is locked within the electrical bay connector 16 for exchange of electronic signals between the module 34 and a processor in the computer. The spring 22 is retracted and biased against the module 34, and the latch 24 (FIG. 1) is engaged against the notch 66 (FIG. 2) locking the module 34 into place.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, although particular dimensions have been provided, above, such dimensions can vary depending upon variations in the actual dimension of the electronic module. Further, the various guides can be made entirely of plastic, entirely of metal or some other combination thereof.

What is claimed is:

1. A removable electronic module for mating with an electrical bay connector within a computer, the electronic module comprising:

an electronic device including an electrical device connector for mating with the electrical bay connector;

a connector guide mounted about the electrical device connector for engaging the electrical bay connector to align the electrical device connector with the electrical bay connector;

an auxiliary device guide positioned apart from the electrical device connector for engaging an auxiliary bay guide to align the connector guide with the electrical bay connector; and a preliminary device guide for guiding the electronic module along a preliminary bay guide and for aligning the auxiliary device guide with the auxiliary bay guide.

2. The removable electronic module of claim 1, wherein the connector guide includes a guide surface positioned apart from the electrical device connector, the guide surface being angled for gradually engaging the electrical bay connector.

3. The removable electronic module of claim 1, wherein the auxiliary device guide includes two angled surfaces for gradually engaging the auxiliary bay guide.

4. The removable electronic module of claim 1, wherein the electronic device is mounted in a tray, and wherein the connector guide and the auxiliary device guide are mounted on the tray.

5. The removable electronic module of claim 1, wherein the preliminary device guide includes elongate rails positioned on opposite sides of the electronic device for engaging opposed channels within the bay.

6. The removable electronic module of claim 1, wherein the electronic device is a memory storage drive.

7. The removable electronic module of claim 1, wherein the electrical device connector includes beveled, edges for gradually engaging the electrical bay connector.

8. The removable electronic module of claim 2, wherein the connector guide includes two opposed flanges for engaging opposite sides of the electrical bay connector, the opposed flanges having angled guide surfaces for gradually engaging the electrical bay connector.

9. The removable electronic module of claim 4, wherein the tray includes a back side from which the electrical device connector extends and upon which both the connector guide and the auxiliary device guide are mounted.

10. A guide system for guiding an electronic device in a bay, the guide system comprising:

a cabinet defining a port opening into a bay;

an electrical bay connector mounted within the bay;

an auxiliary bay guide mounted within the bay, apart from the electrical bay connector;

a removable electronic module sized and shaped to be inserted through the port and mounted within the cabinet, the removable electronic module including an electrical device connector positioned and adapted to mate with the electrical bay connector when the removable electronic module is mounted within the cabinet via the port and an auxiliary device guide;

a connector guide mounted about one of the electrical bay connector and the electrical device connector for engaging one of the electrical device connector and the electrical bay connector to align the electrical device connector with the electrical bay connector;

the auxiliary device guide being positioned apart from the connector guide for engaging the auxiliary bay guide for aligning the connector guide with one of the electrical bay connector and the electrical device connector; and a preliminary bay guide for guiding the removable electronic module through the bay, the removable electronic module further including a preliminary device guide for engaging the preliminary bay guide.

11. The guide system of claim 10, wherein the guide system is a component of a computer, the computer further comprising a processor mounted within the cabinet, wherein the processor is coupled with the electrical bay connector.

12. The guide system of claim 11, wherein the electrical bay connector and the auxiliary bay guide are both mounted at an end of the bay remote from the port.

13. The guide system of claim 11, wherein the connector guide includes a guide surface positioned apart from one of the electrical device connector and the electrical bay connector, the guide surface being angled for gradually engaging one of the electrical bay connector and the electrical device connector.

14. The guide system of claim 11, wherein the electronic device is a memory storage drive.

15. The guide system of claim 13, wherein the connector guide is mounted about the electrical device connector for engaging the electrical bay connector to align the electrical device connector with the electrical bay connector.

16. The guide system of claim 15, wherein the connector guide includes two opposed flanges for engaging opposite opposed flanges having angled guide surfaces for gradually engaging the electrical bay connector.

17. A method of engaging an electrical device connector of an electronic device with an electrical bay connector within a computer bay comprising the steps of:

engaging an auxiliary device guide with an auxiliary bay guide;

engaging a connector guide with one of the electrical bay connector and the electrical device connector to align the electrical device connector with the electrical bay connector, the auxiliary guides aligning the connector guide with one of the electrical device connector and the electrical bay connector; and a preliminary device guide with a preliminary bay guide before engaging the auxiliary device guide with the auxiliary bay guide.

* * * * *